(12) United States Patent
Gashawbeza et al.

(10) Patent No.: US 11,668,848 B2
(45) Date of Patent: Jun. 6, 2023

(54) METHOD AND SYSTEM FOR SEISMIC IMAGING USING S-WAVE VELOCITY MODELS AND MACHINE LEARNING

(71) Applicant: SAUDI ARABIAN OIL COMPANY, Dhahran (SA)

(72) Inventors: Ewenet Gashawbeza, Dhahran (SA); Jianwu Jiao, Dhahran (SA); Saleh M. Al-Saleh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 154 days.

(21) Appl. No.: 17/357,386

(22) Filed: Jun. 24, 2021

(65) Prior Publication Data
US 2022/0413172 A1    Dec. 29, 2022

(51) Int. Cl.
*G01V 1/30* (2006.01)
*G01V 1/28* (2006.01)

(52) U.S. Cl.
CPC .............. *G01V 1/303* (2013.01); *G01V 1/282* (2013.01); *G01V 2210/51* (2013.01); *G01V 2210/614* (2013.01)

(58) Field of Classification Search
CPC .... G01V 1/303; G01V 1/282; G01V 2210/51; G01V 2210/614
See application file for complete search history.

(56) References Cited

U.S. PATENT DOCUMENTS 5,265,068 A   11/1993 Wang et al.
6,820,010 B1  11/2004 Sahai et al.
(Continued)

FOREIGN PATENT DOCUMENTS

CN    106680878 B    3/2019
CN    110879412 A    3/2020
(Continued)

OTHER PUBLICATIONS

Li et al., Reflection Angle-Domain Pseudoextended Least-Squares Reverse Time Migration Using Hybrid Regularization, Dec. 2021, IEEE Transactions on Geoscience and Remote Sensing, vol. 59, No. 12, pp. 10671-10687 (Year: 2021).*

(Continued)

*Primary Examiner* — Mischita L Henson
(74) *Attorney, Agent, or Firm* — Osha Bergman Watanabe & Burton LLP

(57) ABSTRACT

A method may include obtaining a P-wave velocity model and velocity ratio data regarding a geological region of interest. The method may further include generating, based on the P-wave velocity model and the velocity ratio data, an initial S-wave velocity model regarding the geological region of interest. The method may further include determining various velocity boundaries within the initial S-wave velocity model using a trained model. The method may further include updating the initial S-wave velocity model using the velocity boundaries, an automatically-selected cross-correlation lag value based on various seismic migration gathers, and a migration-velocity analysis to produce an updated S-wave velocity model. The method further includes generating a combined velocity model for the geological region of interest using the updated S-wave velocity model and the P-wave velocity model.

20 Claims, 9 Drawing Sheets

(56) References Cited

U.S. PATENT DOCUMENTS

| | | |
|---|---|---|
| 10,782,430 B2 | 9/2020 | Soubaras |
| 2011/0002194 A1 | 1/2011 | Imhof et al. |
| 2011/0320180 A1 | 12/2011 | Al-Saleh |
| 2012/0069713 A1 | 3/2012 | Geerits et al. |
| 2015/0293248 A1 | 10/2015 | Etgen et al. |
| 2015/0316673 A1 | 11/2015 | Wiener et al. |
| 2019/0011582 A1 | 1/2019 | Aarre |
| 2019/0011583 A1 | 1/2019 | Ray et al. |
| 2019/0383965 A1 | 12/2019 | Salman et al. |
| 2020/0096660 A1 | 3/2020 | Eckersley et al. |
| 2020/0183041 A1 | 6/2020 | Denli et al. |
| 2020/0301036 A1 | 9/2020 | Ramfjord et al. |
| 2020/0370423 A1 | 11/2020 | Li et al. |
| 2021/0003728 A1 | 1/2021 | Wang et al. |

FOREIGN PATENT DOCUMENTS

| | | |
|---|---|---|
| CN | 110471111 B | 4/2020 |
| CN | 111929728 A | 11/2020 |
| CN | 112083498 A | 12/2020 |
| WO | 2011056347 A1 | 5/2011 |
| WO | 2016041189 A1 | 3/2016 |
| WO | 2018148492 A1 | 8/2018 |
| WO | 2019055565 A1 | 3/2019 |

OTHER PUBLICATIONS

Rickett, J. and Sava, P. C.; "Offset and angle-domain common image-point gathers for shot-profile migration", Geophysics; vol. 67; No. 3; May 1, 2002; pp. 883-889 (7 pages).

Sava, P. and Fomel, S.; "Time-shift imaging condition for converted waves", SEG Technical Program Expanded Abstracts; Jan. 1, 2006; pp. 2460-2464 (5 pages).

Shen, P. and Symes, W. W.; "Automatic velocity analysis via shot profile migration", Geophysics; vol. 73; No. 5; Sep. 1, 2008; pp. VE49-VE59 (11 pages).

Biondi, B. and Symes, W. W.; "Angle-domain common-image gathers for migration velocity analysis by wavefield-continuation imaging", Geophysics; vol. 69; No. 5; Sep. 1, 2004; pp. 1283-1298 (16 pages).

Sava, P. and Fomel, S.; "Wave-equation common-angle gathers for converted waves", SEG Technical Program Expanded Abstracts; Jan. 1, 2005; pp. 947-950 (4 pages).

Al-Saleh, S. M. and Jiao, J.; "Migration velocity analysis using traveltime wavefield tomography", Geophysics; vol. 77; No. 5; Sep. 7, 2012; pp. U73-U85 (13 pages).

Al-Saleh et al.; "Migration velocity analysis using the common image cube (CIC)", Geophysics; vol. 76, No. 5; Sep. 1, 2011; pp. WB127-WB134 (8 pages).

Luo, Y. and Schuster, G. T.; "Wave-equation traveltime inversion", Geophysics; vol. 56; No. 5; May 1, 1991; pp. 645-653 (9 pages).

Fangshu, Y. and Jianwei, M.; "Deep-learning inversion: A next-generation seismic velocity model building method", Geophysics; vol. 84; No. 5; Jul. 1, 2019; pp. R583-R5999 (17 pages).

Maleki et.al.; "Prediction of shear wave velocity using empirical correlations and artificial intelligence methods", NRIAG Journal of Astronomy and Geophysics; vol. 3; Issue 1; Jun. 1, 2014; pp. 70-81 (12 pages).

Yang et. al.; "S-wave velocity prediction for complex reservoirs using a deep learning method", SEG Technical Program Expanded Abstracts; Aug. 10, 2019; pp. 2574-2578 (5 pages).

Smith, K.J., 2017, Machine learning assisted auto-picking, SEG International Exposition and 87th Annual Meeting, pp. 5686-5690 (5 pages).

Paolo, B., Lipari, V., Tubaro, S., 2017, A machine learning approach to facies classification using well logs, SEG International Exposition and 87th Annual meeting, pp. 2137-2142 (5 pages).

Ronneberger, Olaf "U-Net: Convolutional Networks for Biomedical Image Segmentation" Computer Science Department and BIOSS Centre for Biological Signalling Studies, University of Freiburg, Germany ronneber@informatik.uni-freiburg.de (8 pages).

Araya-Polo, Mauricio et al., "Deep-learning tomography", The Leading Edge, Jan. 2018, pp. 58-66 (9 pages).

Long, Andrew, "Machine Learning and Related Applications to Seismic", Industry Insights, A Clearer Image, PGS, Apr. 2019, pp. 1-4 (4 pages).

Øye, O.K. and E.K. Dahl, "Velocity model building from raw shot gathers using machine learning", Th VW 11, Second EAGE/PESGB Workshop on Velocities, PES GB, Apr. 2019 (3 pages).

Wu, Xinming et al., "Convolutional neural networks for fault interpretation in seismic images", SEG International Exposition and 88th Annual Meeting, SET, 2018, pp. 1946-1950 (5 pages).

International Search Report issued in corresponding International Application No. PCT/US2020/031598, dated Dec. 22, 2020 (5 pages).

Written Opinion issued in corresponding International Application No. PCT/US2020/031598, dated Dec. 22, 2020 (9 pages).

International Search Report issued in corresponding International Application No. PCT/US2022/034899, dated Oct. 14, 2022 (5 pages).

Written Opinion issued in corresponding International Application No. PCT/US2022/034899, dated Oct. 14, 2022 (9 pages).

U. Iturrarán-Viveros et al.; "Machine Learning as a Seismic Prior Velocity Model Building Method for Full-Waveform Inversion: A Case Study from Colombia", Pure and Applied Geophysics; vol. 178; No. 2; Feb. 3, 2021; pp. 423-448 (26 pages).

M. Miyazawa et al.; "Analysis of microearthquake data at Cold Lake and its applications to reservoir monitoring", Geophysics; vol. 73; No. 3; May 2008; pp. O15-O21 (7 pages).

\* cited by examiner

METHOD AND SYSTEM FOR SEISMIC IMAGING USING S-WAVE VELOCITY MODELS AND MACHINE LEARNING

BACKGROUND

By performing a complete migration-wavefield inversion, a migration algorithm may convert time-based seismic data into a depth representation of a subsurface. In particular, a migration algorithm may use a velocity model that represents different particle velocity values within the subsurface to determine image data from data in a data domain. However, migration algorithms may be computational intensive processes due to the required number of calculations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, a P-wave velocity model and velocity ratio data regarding a geological region of interest. The method further includes generating, by the computer processor and based on the P-wave velocity model and the velocity ratio data, an initial S-wave velocity model regarding the geological region of interest. The method further includes determining, by the computer processor, various velocity boundaries within the initial S-wave velocity model using a trained model. The method further includes updating, by the computer processor, the initial S-wave velocity model using the velocity boundaries, an automatically-selected cross-correlation lag value based on various seismic migration gathers, and a migration-velocity analysis to produce an updated S-wave velocity model. The method further includes generating, by the computer processor, a combined velocity model for the geological region of interest using the updated S-wave velocity model and the P-wave velocity model.

In general, in one aspect, embodiments relate to a non-transitory computer readable medium storing instructions executable by a computer processor. The instructions obtain a P-wave velocity model and velocity ratio data regarding a geological region of interest. The instructions further generate, based on the P-wave velocity model and the velocity ratio data, an initial S-wave velocity model regarding the geological region of interest. The instructions further determine various velocity boundaries within the initial S-wave velocity model using a trained model. The instructions further update the initial S-wave velocity model using the velocity boundaries, an automatically-selected cross-correlation lag value based on various seismic migration gathers, and a migration-velocity analysis to produce an updated S-wave velocity model. The instructions further generate a combined velocity model for the geological region of interest using the updated S-wave velocity model and the P-wave velocity model.

In general, in one aspect, embodiments relate to a system that includes a seismic surveying system including a seismic source and various seismic receivers. The system further includes a seismic interpreter that includes a computer processor. The seismic interpreter is coupled to the seismic surveying system. The seismic interpreter obtains a P-wave velocity model and velocity ratio data regarding a geological region of interest. The seismic interpreter generates, based on the P-wave velocity model and the velocity ratio data, an initial S-wave velocity model regarding the geological region of interest. The seismic interpreter determines various velocity boundaries within the initial S-wave velocity model using a trained model. The seismic interpreter updating the initial S-wave velocity model using the velocity boundaries, an automatically-selected cross-correlation lag value based on various seismic migration gathers, and a migration-velocity analysis to produce an updated S-wave velocity model. The seismic interpreter generates a combined velocity model for the geological region of interest using the updated S-wave velocity model and the P-wave velocity model.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
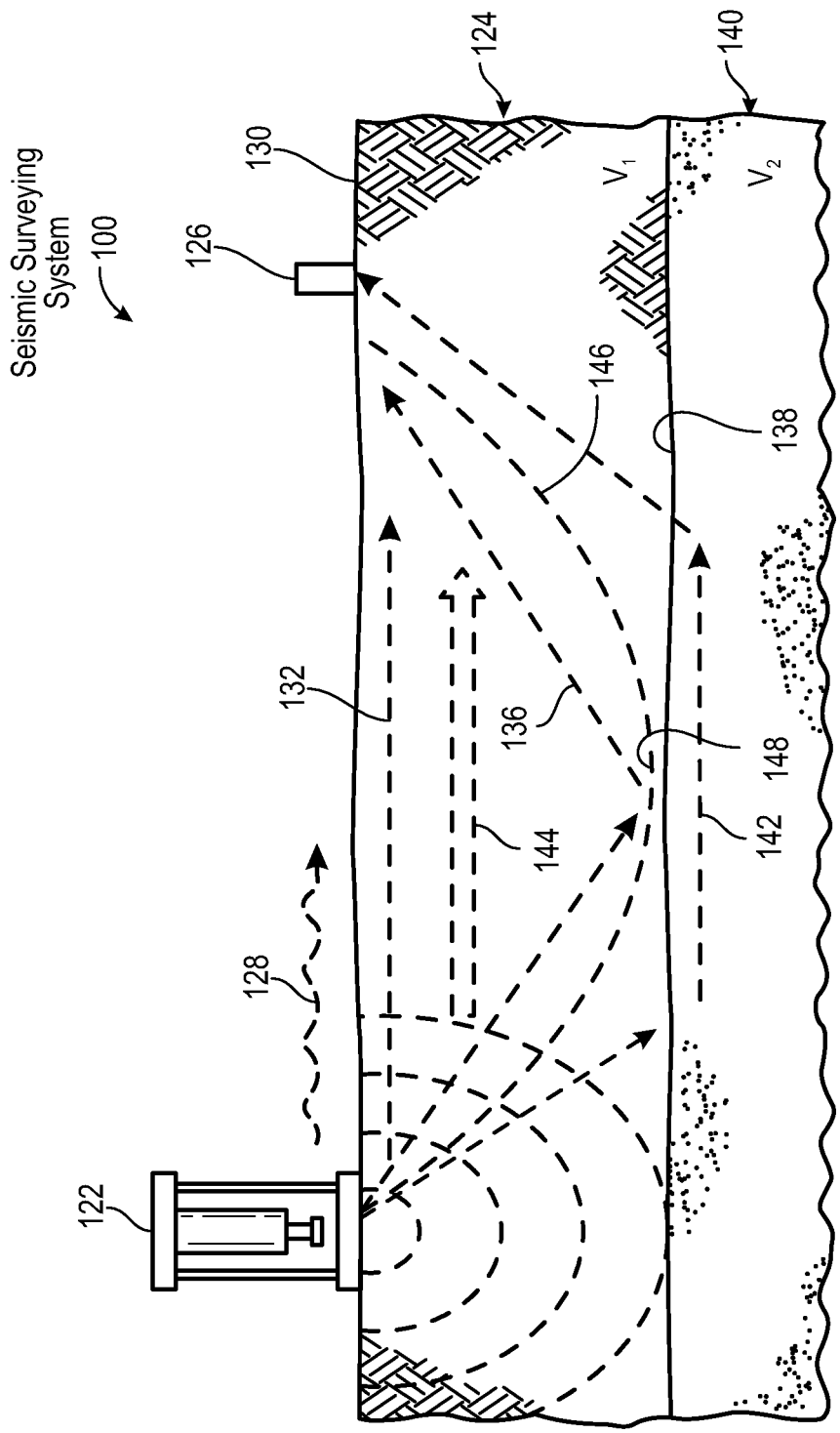
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for automating S-wave velocity model updates. Where P-waves correspond to the primary seismic waves in a seismic survey, S-waves may correspond to secondary waves or shear waves that follow the P-waves. In particular, some embodiments include obtaining a set of migration gathers to identify the optimum cross-correlation lag value for a final S-wave velocity model. For example, the set of migration gathers may be performed using a migration-velocity analysis, such as reverse time migration. Using a selected cross-correlation time lag value, a trained model may then be used to predict S-wave velocity boundaries within an initial S-wave velocity model. The initial S-wave velocity model may be determined from a pre-existing P-wave velocity model and velocity ratio data. As such, by focusing on S-wave velocity model building through machine learning, time shift gathers may be used reduce computational costs while also addressing errors in the final S-wave velocity model.

Some embodiments may include a trained model that may be a machine-learning model for determining velocity boundaries within a geological region of interest, such as a particular subterranean formation. This trained model may use migrated depth images based on seismic data to classify S-wave velocity boundaries for completing tomographic updates. Seismic imaging in complex basins like the Red sea is challenging and may need complimentary information from converted S-waves. Where P-wave imaging is often used for hydrocarbon prospect generation, some embodiments use combined imaging (e.g., an image with corresponding P-wave values and S-wave values) in order to obtain such complimentary information. Combined imaging techniques may avoid various problems that some migration algorithms encounter when a P-wave velocity model is complex (e.g., has sharp boundaries). Moreover, combined depth images may highlight information that is obscured when P-wave images are analyzed alone.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), diving wave A (142), or diving wave B (146), through a subsurface layer (124). Pressure waves generated by the seismic source (122) may travel along several paths through a subsurface layer (124) at a particle velocity $V_1$ for detection at a number of seismic receivers (126) along the line of profile. Likewise, particle velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a particle velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a particle velocity $V_1$, while subsurface layer (140) has a particle velocity $V_2$. In words, different subsurface layers may correspond to different particle velocity values. In particular, a particle velocity may refer to the speed that a pressure wave travels through a medium, e.g., diving wave B (146) that makes a curvilinear ray path (148) through subsurface layer (124). Particle velocity may depend on a particular medium's density and elasticity as well as various wave properties, such as the frequency of an emitted pressure wave. Where a particle velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the particle velocity $V_1$ through the subsurface layer (124) to the seismic receivers (126).

Turning to refracted pressure waves, the seismic source (122) may also generate a refracted wave (i.e., diving wave A (142)) that is refracted at the subsurface interface (138) and travels along the subsurface interface (138) for some distance as shown in FIG. 1 until traveling upwardly to the seismic receivers (126). As such, refracted pressure waves may include diving waves (e.g., diving wave A (142), diving wave B (146)) that may be analyzed to map the subsurface layers (124, 140). For example, a diving wave may be a type of refracted wave that is continuously refracted throughout an earth's subsurface. Thus, a diving wave may be generated where particle velocities are gradually increasing with depth at a gradient. Likewise, the apex of a diving wave may be offset from a common midpoint (CMP) in contrast to reflected seismic energy. Though, for analysis purposes, an apex of a diving wave may be regarded as a common midpoint for the refracted energy. As such, the apex may serve as the basis for organizing and sorting a seismic survey dataset.

Furthermore, in analyzing seismic data acquired using the seismic surveying system (100), seismic wave propagation may be approximated using rays. For example, reflected waves (e.g., reflected wave (136)) and diving waves (e.g., diving waves (142, 146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the particle velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a global optimum that satisfies a predetermined criterion.

With respect to velocity models, a velocity model may map various subsurface layers based on particle velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types change, such as interfaces between different subsurface layers. In some embodiments, a velocity model is updated using one or more tomographic updates to adjust the velocity boundaries in the velocity model.

Figure 2:
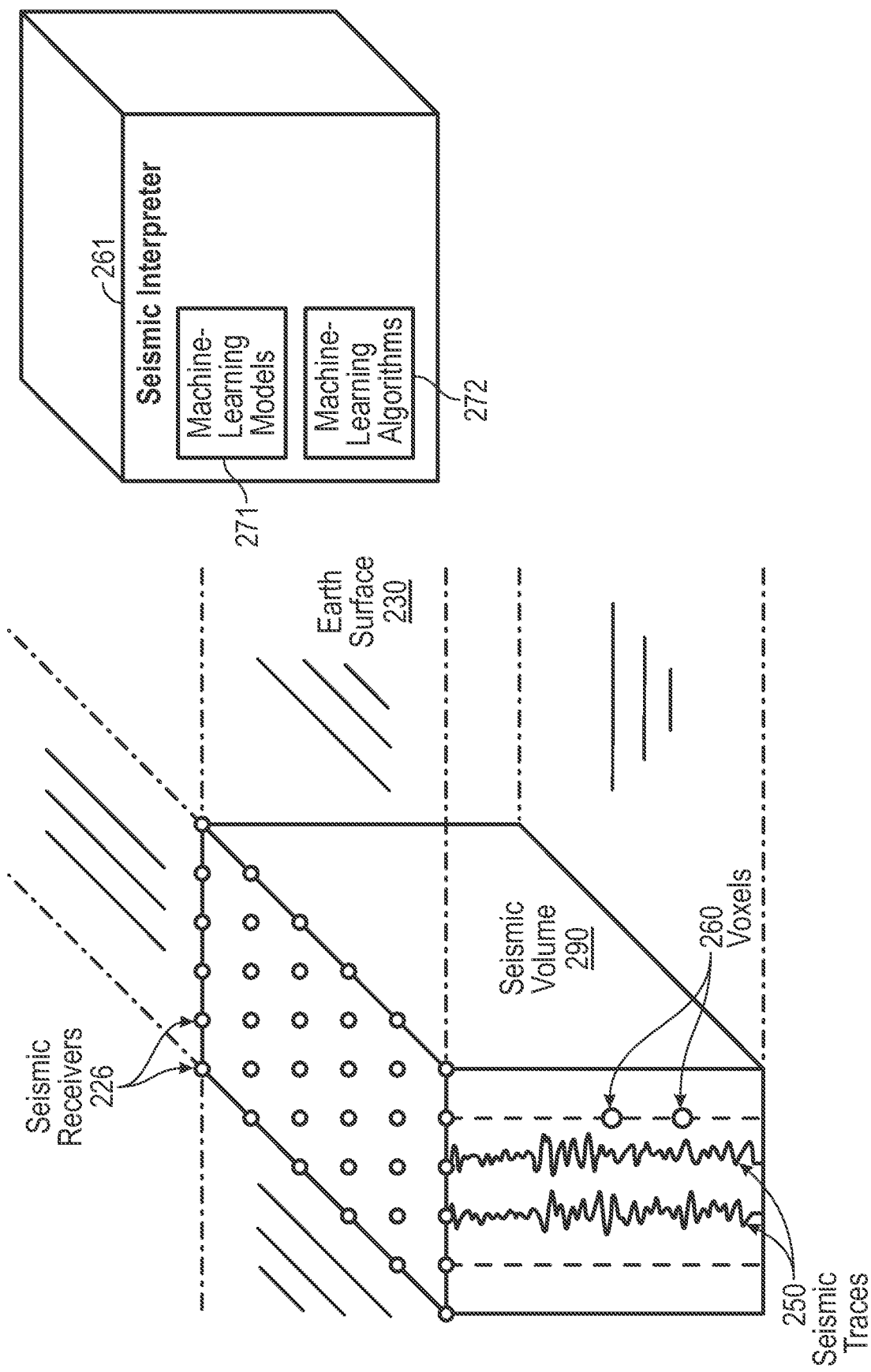

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a three-dimensional cubic dataset of seismic traces. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot−Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Keeping with seismic imaging, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes multiple NMO gathers with amplitudes sampled from a common midpoint (CMP). In particular, a NMO correction may be a seismic imaging approximation based on calculating reflection travel times. However, NMO-stack results may not indicate an accurate subsurface geology, where the subsurface geology is complex with large heterogeneities in particle velocities or when a seismic survey is not acquired on a horizontal plane. Ocean-Bottom-Node surveys and rough topographic land seismic surveys may be examples where NMO-stack results fail to depict subsurface geologies.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) may include hardware and/or software with functionality for storing the seismic volume (290), well logs, core sample data, and other data for seismic data processing, well data processing, training operations, and other data processes accordingly. In some embodiments, the seismic interpreter (261) may include a computer system that is similar to the computer (602) described below with regard to FIG. 9 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Keeping with the seismic interpreter (261), seismic interpreter (261) may include hardware and/or software with functionality for generating one or more machine-learning models (270) for use in analyzing seismic data and one or more subsurface formations. For example, seismic interpreter (261) may use and/or process seismic data as well as other types of data to generate and/or update one or more machine-learning models (270) and/or one or more velocity models. Thus, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. Supervised learning algorithms may include linear regression algorithms, nearest neighbor algorithms, decision trees, etc. In some embodiments, two or more different types of machine-learning models are integrated into a single machine-learning architecture, e.g., a machine-learning model may include decision trees and neural networks. In some embodiments, the seismic interpreter (261) may generate augmented or synthetic data to produce a large amount of interpreted data for training a particular model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights and biases for adjusting the data inputs. These network weights and biases may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, various types of machine learning algorithms (e.g., machine-learning algorithms (271)) may be used to train a model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the electronic model. One example of a backpropagation algorithm is a Levenberg-Marqardt algorithm. In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained iteratively using epochs until the model achieves a predetermined level of prediction accuracy. Thus, better training of a model may lead to better predictions by a trained model.

In some embodiments, a machine-learning model is trained using a training dataset that includes human-picked data, augmented data, and/or synthetic data. For example, data augmentation may include performing various processes on acquired human-picked boundary data, such as log cropping or adding noise, in order to generate augmented boundary data. In particular, data augmentation may introduce various machine-learning algorithms to uncommon problems in order to increase a trained model's ability to predict boundary data, such as velocity boundaries. Likewise, data augmentation may be performed in order to generate an extended dataset sufficient to train a model. For example, a data augmentation process may alter a normal seismic dataset to produce a different or more complex seismic dataset. Through such augmented boundary data, an artificial intelligence model may be made immune to various abnormalities in velocity-boundary picking.

In some embodiments, a data augmentation process may include a random modification where migrated seismic data is modified data from an original state to a modified one. Data augmentation may also include a smoothing operation to remove data spikes within human-picked boundary data, such as through resampling or smoothing the data. In another embodiment, data augmentation may include an intrusion operation where random values are added to the human-picked boundary data in specific areas depending on the type of augmenting factor. In another embodiment, data augmentation may include a random noise operation that adds noise in different amounts to different depths of a migrated seismic image. Such added noise may increase the complexity of velocity boundary picking and thus the boundary data. In another embodiment, data augmentation includes a cut operation that remove velocity boundary data randomly from the original data. For example, data augmentation may be performed to emulate migrated seismic data and velocity boundaries for different rock facies, differences in layer thicknesses that occur within a formation, and other geological scenarios. Other data augmentation operations may include random null operations that randomly assign a zero value, random shifting operations that shift a range of data values within the data, masking data, and/or rotating data. While some of data augmentation operations are described as being random, the data augmenting processes may include pseudorandom processes tailored to specific criteria. In some embodiments, for example, data augmentation operations may be a function of a particular geologist's requirements for manipulating the human-picked boundary data.

Figure 3:
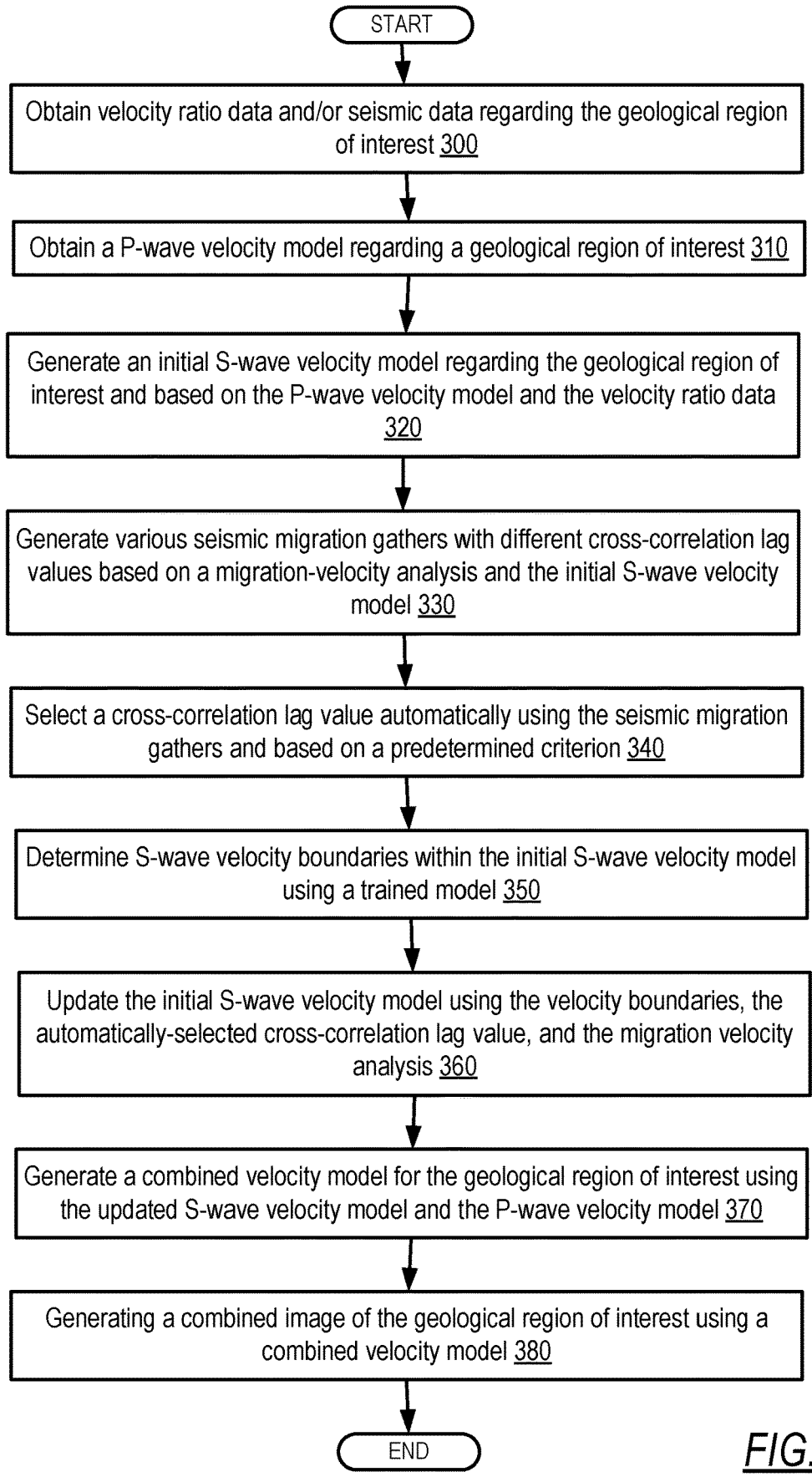
FIG. 3 shows a flowchart in accordance with one or more embodiments.

Turning to FIG. 3, FIG. 3 shows a flowchart in accordance with one or more embodiments. Specifically, FIG. 3 describes a general method for generating a combined velocity model and/or generating a seismic image using the combined velocity model. One or more blocks in FIG. 3 may be performed by one or more components (e.g., seismic interpreter (261)) as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, velocity ratio data and/or seismic data are obtained regarding a geological region of interest in accordance with one or more embodiments. In some embodiments, for example, velocity ratio data describes a ratio of a P-wave velocity to an S-wave velocity at a particular location (e.g., a $V_P/V_S$ value) in a geological region of interest. For example, a velocity ratio may depend on various geological properties, such as porosity, degree of consolidation, clay content, differential pressure, pore geometry, and other geological factors. As such, a velocity ratio may correspond to a constant value or a function of values for different rock types. Likewise, velocity ratio data may be determined using well logging samples, core samples, and/or seismic data. Seismic data may be similar to the seismic data described above in regard to FIGS. 1 and 2.

In Block 310, a P-wave velocity model is obtained regarding a geological region of interest in accordance with one or more embodiments. For example, a P-wave velocity model may describe particle velocities for P-waves at different regions within a subsurface. In some embodiments, a P-wave velocity model is known from previous seismic data processing. Likewise, a P-wave velocity model may be determined using one or more seismic inversion operations and/or one or more migration algorithms. In some embodiments, background S-wave velocities are assumed to have no effect on the source-side kinematics in regard to the P-wave velocity model.

In Block 320, an initial S-wave velocity model is generated regarding a geological region of interest and based on a P-wave velocity model and velocity ratio data in accordance with one or more embodiments. An initial S-wave velocity model (also called a shear wave velocity model) may be generated by modeling the velocity structure of media in the subsurface using a form of inversion of seismic data, typically referred to as seismic inversion. After obtaining P-wave velocity model through seismic inversion, for example, P-wave velocity values may be converted to S-wave velocity value using velocity ratio data. In seismic inversion operations, a velocity model may be iteratively improved until the velocity model and the seismic data and/or velocity ratio data are in agreement, e.g., the solution of the velocity model converges to a global optimum that satisfies a particular criterion.

In Block 330, various seismic migration gathers are generated with different cross-correlation lag values based on a migration-velocity analysis and an initial S-wave velocity model in accordance with one or more embodiments. For example, time-lag migration gathers may be generated based on an initial S-wave velocity model, e.g., the initial S-wave velocity model from Block 320. A gather may include a collection of input traces made from seismic data according to some trace header parameter. A migration gather may be the result of a migration-velocity analysis being applied to traces in a gather. Before implementing a complete tomographic inversion of the initial S-wave velocity model, for example, migration gathers may be generated using reverse-time migration (RTM) or phase-shift-plus-interpolation (PSPI) method with various cross correlation time lags. Thus, multiple volumes of stacked images may be generated in a migration gather for different cross correlation lag values.

In some embodiments, various nonzero-lag common image gathers (CIG) are generated using a cross-correlation imaging condition, which combine to form a common image cube (CIC). Slicing the CIC at different cross-correlation lag values may generate a series of CIGs. Thus, flattened events may occur in the CIGs at a cross-correlation lag other than the zero-lag when an incorrect velocity model is being used in a migration algorithm.

In some embodiments, migration gathers are smoothed using a smoothing function. For example, migrated gathers may be generated at each surface location and smoothed spatially along local dips within a sliding (i.e., moving) window. On the smoothed gathers, the highest amplitude coherent energy may be selected. Due to the "smoothing", highest amplitudes may be coherent or continuous among adjacent locations in a respective gather. Smoothing may also reduce the noise from the gathers.

In Block 340, a cross-correlation lag value is selected automatically using various seismic migration gathers and based on a predetermined criterion in accordance with one or more embodiments. For example, a cross-correlation lag value may correspond to a correlation shift $\Delta\tau$ (i.e., a tau value) in a cross-correlation equation. More specifically, a correlation shift $\Delta\tau$ may be used in various migration-velocity analysis techniques to update an initial velocity model or generate migration gathers.

In some embodiments, for example, a seismic interpreter may automatically select a cross correlation lag value by analyzing a maximum stacked response among various migration gathers. In particular, the maximum stacked response may describe the highest degree of continuity and amplitude coherent energy among the different migration gathers based on different cross-correlation lag values. As such, the predetermined criterion may be the highest amplitude coherent energy among the migration gathers. Likewise, the predetermined criterion may also correspond to a predetermined degree of coherent energy within the migration gathers.

In some embodiments, a seismic interpreter analyzes a CIG to determine a cross-correlation lag value at a focusing depth in which an event in the CIG is flattest. As such, the seismic interpreter may model a Green's function by seeding a source at the focusing depth using one-way wave-equation tomography. In particular, the seismic interpreter may shift a modeled wavefield with the corresponding cross-correlation lag value. This migration-velocity analysis process may be repeated for events in the CIGs at different lateral and vertical positions. The result of the migration-velocity analysis may be a set of velocity modeled data whose wavefield approximates the wavefield where the closest velocity model to the actual subsurface had been used to simulate these migration gathers.

In Block 350, various S-wave velocity boundaries are determined within an initial S-wave velocity model using a trained model in accordance with one or more embodiments. In some embodiments, for example, a machine-learning model is trained based on a training dataset that includes human-picked boundary data and augmented boundary data. Thus, one or more training operations may be performed to produce a trained model from a machine-learning model In some embodiments, a seismic interpreter uses a trained model to determine velocity boundaries of one or more subsurface layers or facies. For example, the trained model may be a convolutional neural network, such as a U-net model, that is trained using a machine-learning algorithm. More specifically, a U-net model may have a deep neural network architecture that includes functionality for classifying and/or segmenting images. In a deep neural network, a layer of neurons may be trained on a predetermined list of features based on the previous network layer's output. Thus, as data progress through the deep neural network, more complex features may be identified within the data by neurons in later layers. Likewise, a U-net or other type of convolutional neural network may include various convolutional layers, pooling layers, fully connected layers, and/or normalization layers to produce a particular type of output. Thus, convolution and pooling functions may be the activation functions within a convolutional neural network. For more information on U-net models, see FIG. 8 below and the accompanying description.

After one or more training operations, a trained model may obtain a migrated S-wave image as an input and produce S-wave velocity boundaries as an output, e.g., in a velocity boundary map. Velocity boundaries may correspond to various horizons of particular facies within the subsurface. Thus, velocity boundaries may be used for a tomographic update of an initial S-wave velocity model. As such, velocity boundaries may be selected from an optimum stacked image based on the automatically-selected cross correlation lag value. In some embodiments, for example, top velocity boundaries and base velocity boundaries of a salt body are automatically determined within a subterranean formation. For example, a seismic interpreter may isolate salt bodies from non-salt bodies using an automated selection process. In particular, this automated selection process may use artificial intelligence for identifying these salt velocity boundaries for subsalt imaging. In contrast, velocity boundary picking may be performed manually by geologists over days or months. Through an automated selection process, a seismic interpreter may reduce the amount of time needed for generating optimum seismic images and thus increase resources for other areas. For example, by reducing the amount of time for determining velocity boundaries, better seismic images may be obtained. These better seismic images may increase the chances of finding oil and gas generated in complex environments, such as the Red Sea, which is considered one of the most complex geological basins of the world. Thus, the automated selection process may determine boundaries of complicated subsurface structures, thick salt deposits, and/or rugged seafloor topography that may prove problematic in forming accurate subsurface seismic images.

In some embodiments, a trained model is validated by determining whether the trained model predicts S-wave velocity boundaries at a predetermined accuracy level. For example, the trained model may be verified using a testing dataset not used in a training operation. If the validation is below an accuracy threshold, for example, the trained model may continue training until a satisfactory output (i.e., satisfactory predicted S-wave velocity boundaries) are achieved.

In Block 360, an initial S-wave velocity model is updated using various velocity boundaries, an automatically-selected cross-correlation lag value, and a migration-velocity analysis in accordance with one or more embodiments. For example, S-wave velocity boundaries from Block 350 and the automatically-selected cross-correlation lag value may be inputs to a migration-velocity analysis for updating an initial S-wave velocity model. In some embodiments, the migration-velocity analysis is based on wave-equation traveltime tomography that may update the velocity model in the presence of various velocity errors and a complex environment. For example, in one or more embodiments, the migration-velocity analysis is one-way wave-equation tomography. In other embodiments, other migration functions may be used such as ray tracing or two-way wave-equation tomography may also be used to update a velocity model.

In some embodiments, an updated S-wave velocity model is validated. For example, an S-wave velocity model may be updated until the velocity values converge to a predetermine criterion (e.g., changes between update iterations is below a predetermined threshold). Likewise, a seismic interpreter may determine whether the updated S-wave velocity model has achieved a global optimum using velocity ratio data, seismic data, and/or a P-wave model.

In Block 370, a combined velocity model is generated for a geological region of interest using an updated S-wave velocity model and a P-wave velocity model in accordance with one or more embodiments. In some embodiments, a combined velocity model includes a P-wave velocity model and an S-wave velocity model. For example, a combined velocity model may be an earth model that describes the geological region of interest. Where combined velocity model generation may be challenging using conventional P-wave imaging techniques alone, dual P-wave imaging and S-wave imaging may produce an accurate combined velocity model. Thus, seismic images based on a combined velocity model may provide more information that may be obscured from P-wave images.

In some embodiments, a combined velocity model is used in one or more shear wave analyses for the geological region of interest. For example, site-specific shear wave velocities may be used to determine a classification of a potential well site, e.g., in regard to structural supports and different types of well plans. Thus, a combined velocity model may be used in hydrocarbon exploration and well construction engineering.

In Block 380, a combined image of a geological region of interest is generated using a combined velocity model in accordance with one or more embodiments. For example, the combined image may be a PS-image that illustrates P-wave velocity boundaries and S-wave velocity boundaries along with other seismic attribute information. In some embodiments, a geological region of interest corresponds to an area of a subterranean formation that may be desired for further analysis, such as for a prospective drilling operation or reservoir modeling. Thus, the combined image may provide a spatial and depth illustration of a subterranean formation for various practical applications, such as predicting hydrocarbon deposits, predicting wellbore paths for geosteering, etc.

With respect to PS-images, a PS-image may provide complimentary information absent from a regular P-wave image of the geological region of interest. Accordingly, PS-images may provide increase image accuracy below gas bearing zones which may be challenging for P-images alone. Likewise, a PS-image may have better resolution for imaging near-surface structures. In some embodiments, PS-images are used to determine fracture density and fracture orientation analysis, e.g., for well stimulation operations or hydraulic fracturing operations.

As shown above in FIG. 3, some embodiments use machine learning, automatic velocity picking, and velocity ratio data to build a subsurface S-wave velocity model for a complex geological environment from acquired seismic survey data. From this S-wave velocity model, a combined velocity model may be generated for exploration of complicated geological regions, such as salt bodies. Thus, various techniques may reduce the high drilling costs associated with drilling through such complex geological structures. Thus, some embodiments provide an automated workflow for overcoming the complexity associated with various geological environments for hydrocarbon exploration and production.

Turning to FIGS. 4, 5, 6, and 7, FIGS. 4, 5, 6, and 7 provide examples of updating an S-wave velocity model through an automatic selection of a cross-correlation lag value and using a trained model to determine S-wave velocity boundaries. The following examples are for explanatory purposes only and not intended to limit the scope of the disclosed technology.

Figure 4:
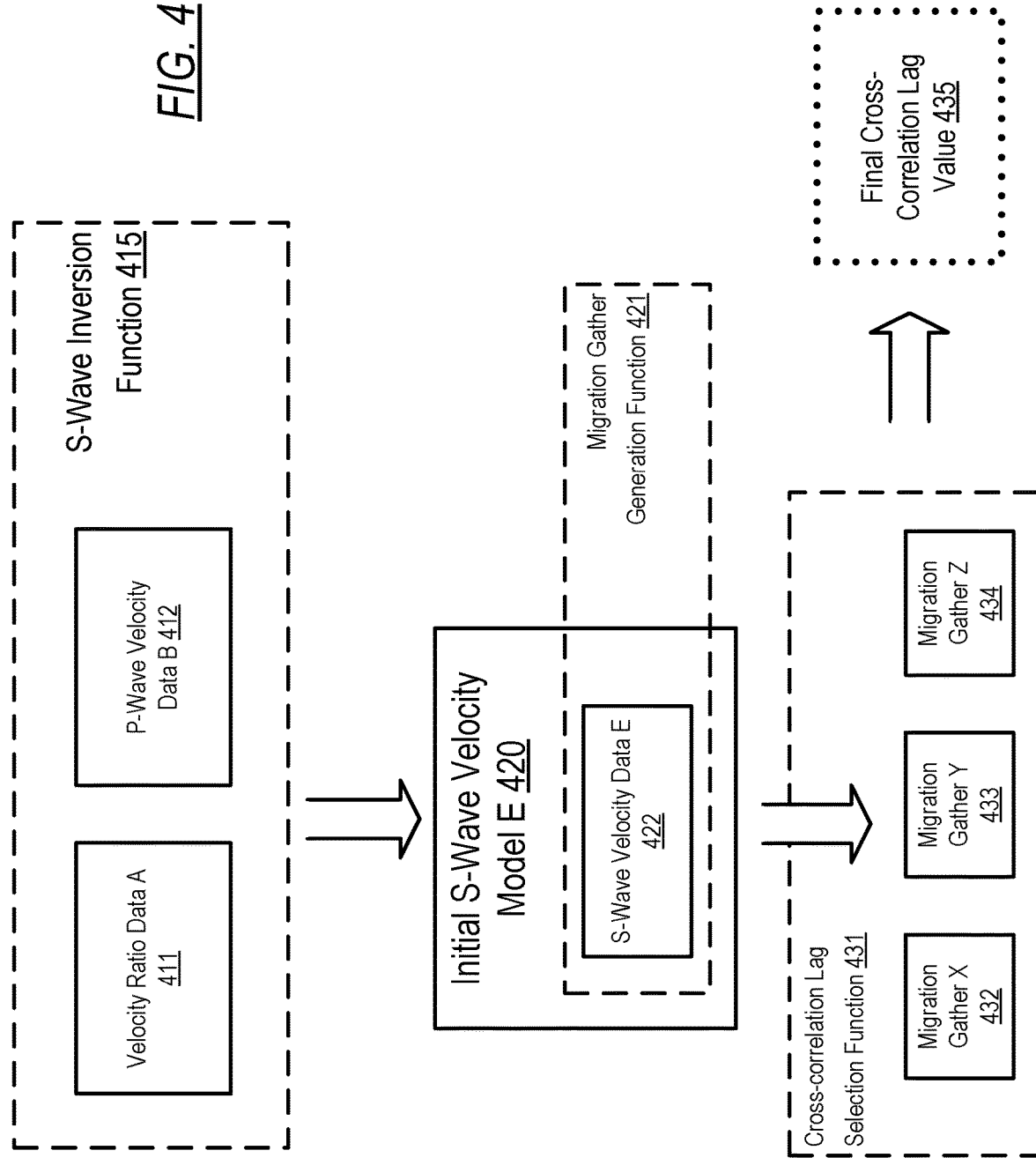
FIGS. 4, 5, 6, and 7 show examples in accordance with one or more embodiments.

In FIG. 4, a seismic interpreter obtains velocity ratio data A (411) and P-wave velocity data B (412). Using an S-wave inversion function (415), the velocity ratio data A (411) and the P-wave velocity data B (412) are used to generate an initial S-wave velocity model E (420) that includes S-wave velocity data E (422). The seismic interpreter uses a migration gather generation function (421) that performs an RTM or a PSPI method to generate various migration gathers (i.e., migration gather A (432), migration gather B (433), migration gather C (434)). The seismic interpreter may use an automated selection process (i.e., cross-correlation lag selection function (431)) on the migration gathers (432, 433, 434) to determine a final cross-correlation lag value (435). The final cross-correlation lag value (435) may correspond to the cross-correlation lag value that produced the highest coherent amplitude among the migration gathers (432, 433, 434), i.e., as the predetermined criterion.

Figure 5:
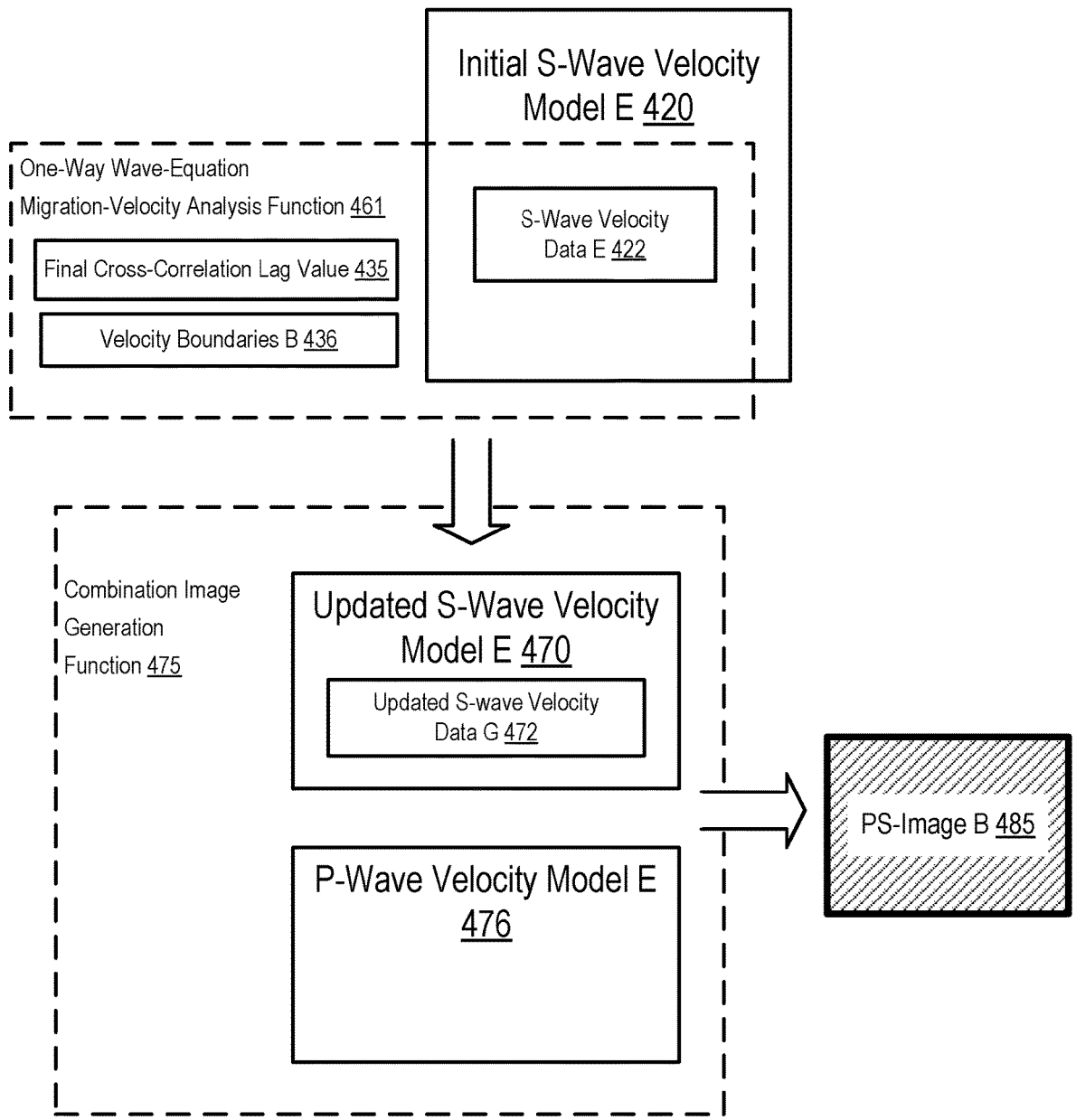

Turning to FIG. 5, the initial S-wave velocity model E (420) is updated using a migration-velocity analysis function (461). Here, one-way wave-equation tomography is performed on the initial S-wave velocity model E (420) using the final cross-correlation lag value (435) from FIG. 4 and S-wave velocity boundaries B (436) in a one-way wave-equation migration-velocity analysis function (461). The output of the migration-velocity analysis function (461) is an updated S-wave velocity model E (470) that includes updated S-wave velocity data G (472). For example, the seismic interpreter may use an automated velocity boundary selection function (not shown) with a trained model (not shown) to determine a velocity boundary map from one or more migrated seismic images. In particular, a velocity boundary map may include various velocity boundaries that correspond to various salt bodies deposited within a subterranean region that is illustrated in a migrated seismic image. These velocity boundaries may be used to produce the updated S-wave velocity model E (470). Accordingly, the seismic interpreter then uses a combination image generation function (475) with the updated S-wave velocity model E (470) and the P-wave velocity model E (476) to generate a PS-image B (485).

Figure 6:
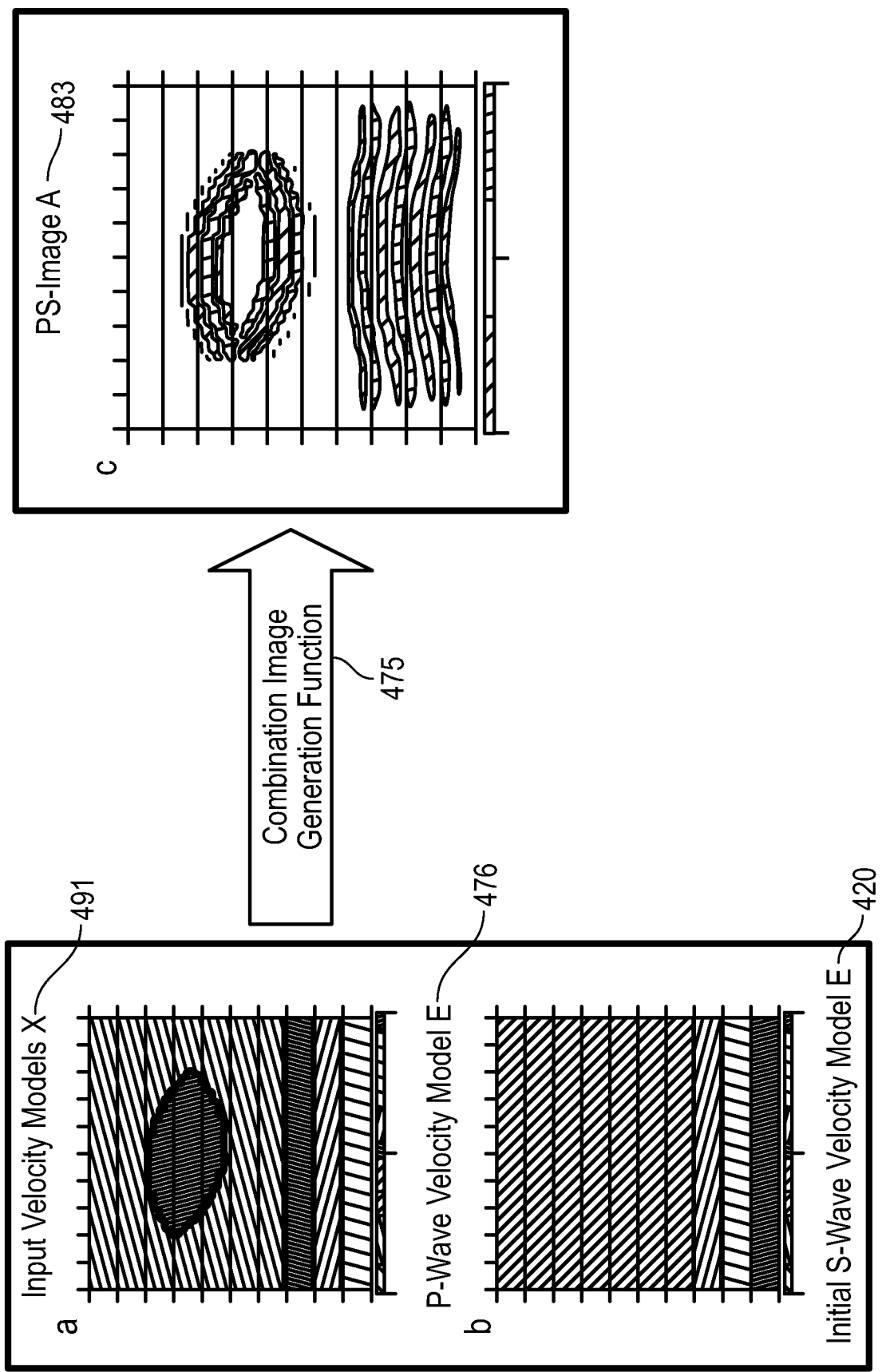
Figure 7:
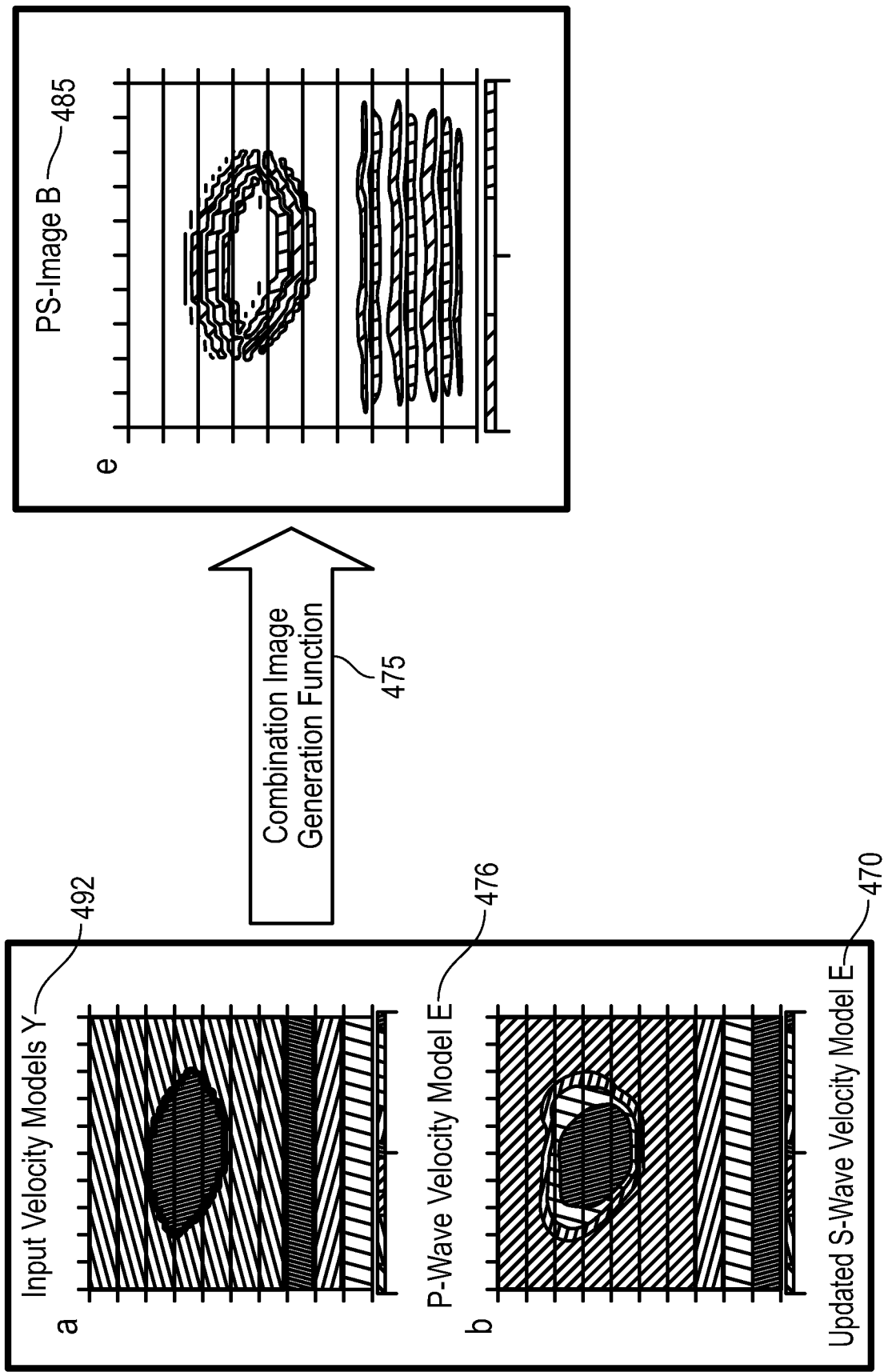

Turning to FIGS. 6 and 7, a seismic interpreter uses the velocity models (420, 470, 476) as inputs to a combination image generation function (475). In FIG. 6, the input velocity models X (491) include the P-wave velocity model E (476) and the initial S-wave velocity model E (420). Using these velocity models (476, 420), the seismic interpreter generates a PS-image A (483). In FIG. 7, input velocity models Y (492) include the P-wave velocity model E (476) and the updated S-wave velocity model E (470). Using these velocity models (476, 470), the seismic interpreter generates a PS-image B (485). Based on a comparison of PS-image A (483) and PS-image B (485), PS-image B (485) provides a better representation of the underlying subterranean formations.

Figure 8:
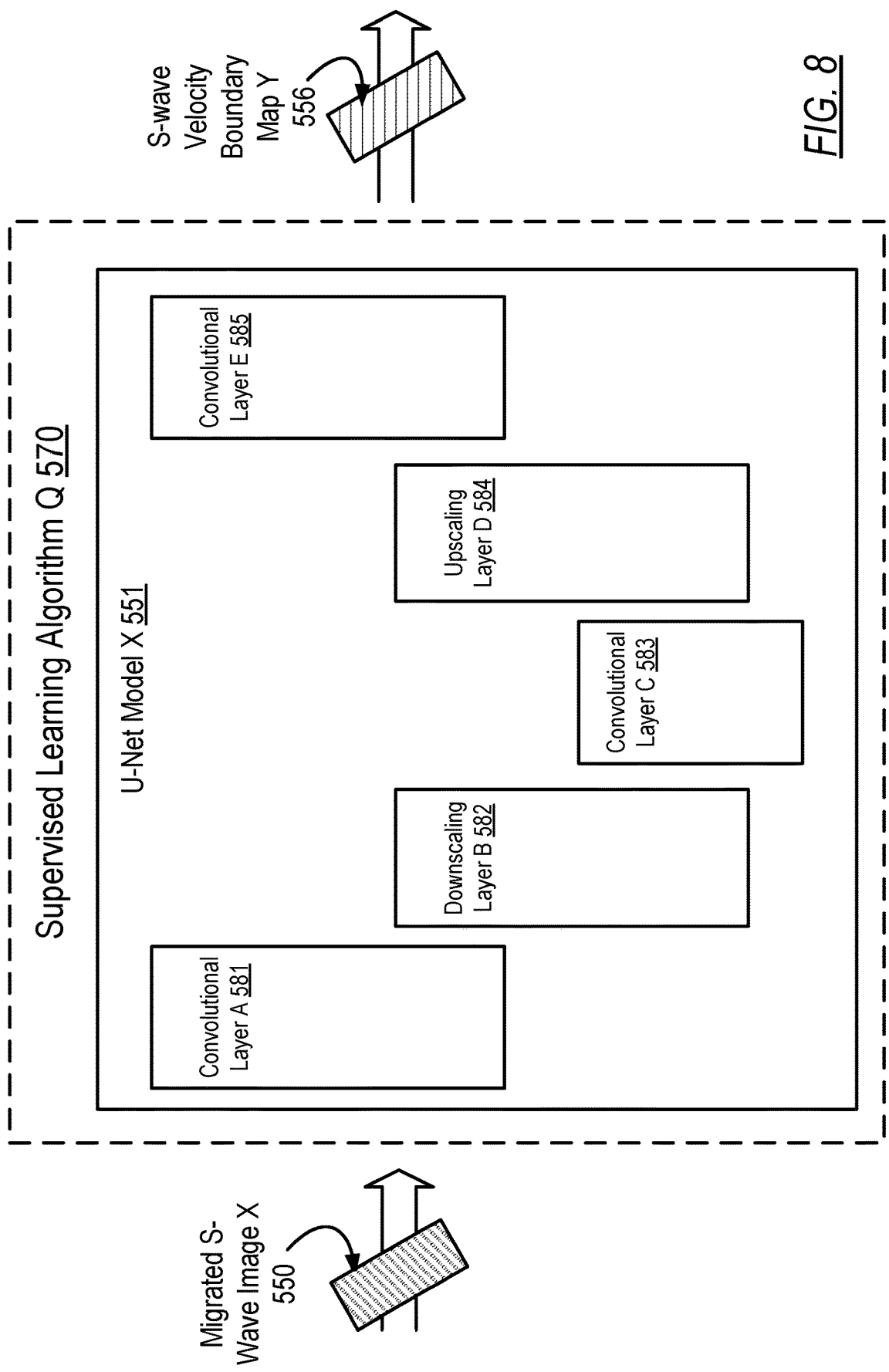
FIG. 8 shows an example in accordance with one or more embodiments.

Turning to FIG. 8, FIG. 8 provides an example of generating a U-Net model to predict S-wave velocity boundaries of a subterranean formation. The following example is for explanatory purposes only and not intended to limit the scope of the disclosed technology.

In FIG. 8, a U-Net model X (551) is trained using a supervised learning algorithm Q (570) for predicting velocity boundaries within migrated seismic images (e.g., migrated seismic image X (550)). In particular, the U-Net model X (551) includes five hidden layers, i.e., three convolutional layers (i.e., convolutional layer A (581), convolutional layer C (583), convolutional layer E (585)), a downscaling layer B (582), and an upscaling layer D (584). Moreover, the U-Net model X (551) obtains an image (i.e., migrated S-wave image X (550)) as an input for predicting S-wave velocity boundaries and training.

Keeping with FIG. 8, the U-Net model X (551) includes a contracting path (left side) and an expansive path (right side). In the contracting path, the U-Net model X (551) corresponds to a convolutional network architecture, where various rectified linear units (not shown) and max pooling operations (not shown) produce a downsampled description of predetermined features (e.g., a feature map) within the migrated S-wave image X (550). As such, feature channels may be increase during the contracting path. In the expansive path, a feature map is upsampled that decreases the number of feature channels. At the final layer (i.e., convolutional layer E (585), the resulting feature map is associated with a desired number of classes that describe S-wave velocity boundaries within the S-wave velocity boundary map Y (556).

Figure 9:
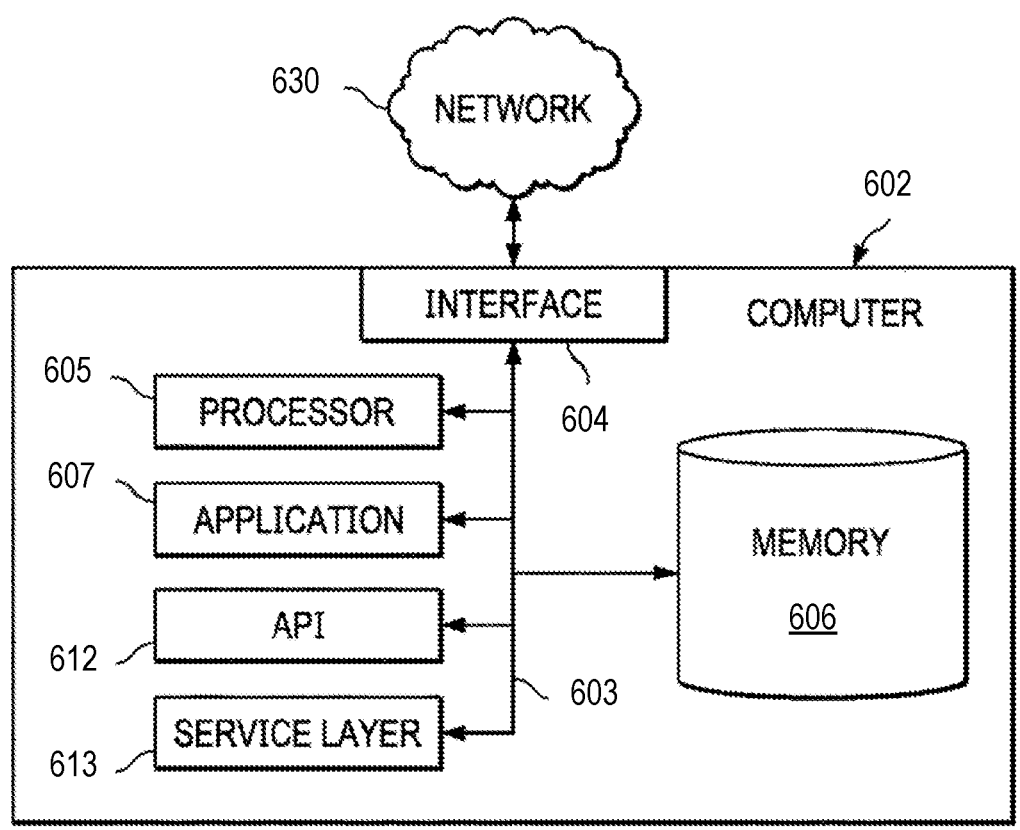
FIG. 9 shows a computing system in accordance with one or more embodiments.

Embodiments may be implemented on a computer system. FIG. 9 is a block diagram of a computer system used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630) or cloud. In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) or cloud from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 9, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630) or cloud. More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 9, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 9, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
obtaining, by a computer processor, a P-wave velocity model and velocity ratio data regarding a geological region of interest;
generating, by the computer processor and based on the P-wave velocity model and the velocity ratio data, an initial S-wave velocity model regarding the geological region of interest;
determining, by the computer processor, a plurality of velocity boundaries within the initial S-wave velocity model using a trained model;
updating, by the computer processor, the initial S-wave velocity model using the plurality of velocity boundaries, an automatically-selected cross-correlation lag value based on a plurality of seismic migration gathers, and a migration-velocity analysis to produce an updated S-wave velocity model; and
generating, by the computer processor, a combined velocity model for the geological region of interest using the updated S-wave velocity model and the P-wave velocity model.

2. The method of claim 1, further comprising:
generating a combined image of the geological region of interest using the combined velocity model,
wherein the combined image describes a plurality of different S-wave velocities and a plurality of different P-wave velocities in the geological region of interest.

3. The method of claim 1, further comprising:
generating a plurality of seismic migration gathers with different cross-correlation lag values based on the migration-velocity analysis and the initial S-wave velocity model; and
selecting, by the computer processor, a predetermined cross-correlation lag value automatically using the plurality of seismic migration gathers and based on a predetermined criterion,
wherein the automatically-selected cross-correlation lag value corresponds to the predetermined cross-correlation lag value.

4. The method of claim 3,
wherein the different cross-correlation lag values are based on a travel time inversion process that is performed using ray tracing, one-way wave-equation tomography, or two-way wave-equation tomography.

5. The method of claim 1,
wherein the trained model is a convolutional neural network comprising a plurality of convolutional layers, at least one downscaling layer, and a least one upscaling layer,
wherein the trained model obtains a migrated seismic image as an input, and
wherein the trained model generates a velocity boundary map as an output.

6. The method of claim 1,
wherein the trained model is a machine-learning model that is trained using a training dataset comprising human-picked boundary data and augmented boundary data,
wherein the trained model is trained using a plurality of machine-learning epochs, and
wherein a respective machine-learning epoch among the plurality of machine-learning epochs trains a machine-learning model using a portion of the training dataset to produce the trained model.

7. The method of claim 1,
wherein the migration-velocity analysis is a one-way wave-equation tomographic operation.

8. The method of claim 1,
wherein the velocity ratio data describes a predetermined ratio between a P-wave value and an S-wave value at a predetermined location in the geological region of interest.

9. The method of claim 1, further comprising:
acquiring, using a seismic surveying system, seismic data regarding the geological region of interest; and
generating the P-wave velocity model using the seismic data and a seismic inversion operation.

10. The method of claim 1, further comprising:
obtaining first human-picked boundary data that describes a first plurality of velocity boundaries within a first migrated seismic image;
obtaining augmented boundary data that describes a second plurality of velocity boundaries within a second migrated seismic image, wherein the augmented boundary data is generated from second human-picked boundary data using an augmentation operation;
generating the trained model using a plurality of machine-learning epochs and training data comprising the first human-picked boundary data and the augmented boundary data; and
determining one or more S-wave velocity boundaries using the trained model and migrated seismic data.

11. The method of claim 10, further comprising:
obtaining a third human-picked boundary data,
wherein the trained model is updated during the plurality of machine-learning epochs based on a comparison between at least a portion of the third human-picked boundary data and predicted boundary data that is generated by the trained model.

12. The method of claim 10,
wherein the plurality of machine-learning epochs are training iterations for the trained model, and
wherein a respective machine-learning epoch among the plurality of machine-learning epochs trains the trained model using a predetermined portion of the training data.

13. The method of claim 10,
wherein the augmentation operation is selected from a group consisting of: a rotation operation, a shifting operation, a cut operation, an intrusion operation, and a deformation operation.

14. A non-transitory computer readable medium storing instructions executable by a computer processor, the instructions comprising functionality for:
obtaining a P-wave velocity model and velocity ratio data regarding a geological region of interest;
generating, based on the P-wave velocity model and the velocity ratio data, an initial S-wave velocity model regarding the geological region of interest;
determining a plurality of velocity boundaries within the initial S-wave velocity model using a trained model;

updating the initial S-wave velocity model using the plurality of velocity boundaries, an automatically-selected cross-correlation lag value based on a plurality of seismic migration gathers, and a migration-velocity analysis to produce an updated S-wave velocity model; and generating a combined velocity model for the geological region of interest using the updated S-wave velocity model and the P-wave velocity model.

15. The non-transitory computer readable medium of claim 14, wherein the instructions further comprise functionality for:

generating a combined image of the geological region of interest using the combined velocity model, wherein the combined image describes a plurality of different S-wave velocities and a plurality of different P-wave velocities in the geological region of interest.

16. The non-transitory computer readable medium of claim 14, wherein the instructions further comprise functionality for:

generating a plurality of seismic migration gathers with different cross-correlation lag values based on the migration-velocity analysis and the initial S-wave velocity model; and selecting, by the computer processor, a predetermined cross-correlation lag value automatically using the plurality of seismic migration gathers and based on a predetermined criterion, wherein the automatically-selected cross-correlation lag value corresponds to the predetermined cross-correlation lag value.

17. The non-transitory computer readable medium of claim 14, wherein the trained model is a machine-learning model that is trained using a training dataset comprising human-picked boundary data and augmented boundary data, wherein the trained model is trained using a plurality of machine-learning epochs, and wherein a respective machine-learning epoch among the plurality of machine-learning epochs trains a machine-learning model using a portion of the training dataset to produce the trained model.

18. A system, comprising:

a seismic surveying system comprising a seismic source and a plurality of seismic receivers; and a seismic interpreter comprising a computer processor, wherein the seismic interpreter is coupled to the seismic surveying system, the seismic interpreter comprising functionality for:

obtaining a P-wave velocity model and velocity ratio data regarding a geological region of interest;

generating, based on the P-wave velocity model and the velocity ratio data, an initial S-wave velocity model regarding the geological region of interest;

determining a plurality of velocity boundaries within the initial S-wave velocity model using a trained model;

updating the initial S-wave velocity model using the plurality of velocity boundaries, an automatically-selected cross-correlation lag value based on a plurality of seismic migration gathers, and a migration-velocity analysis to produce an updated S-wave velocity model; and generating a combined velocity model for the geological region of interest using the updated S-wave velocity model and the P-wave velocity model.

19. The system of claim 18, wherein the seismic interpreter further comprises functionality for:

generating a combined image of the geological region of interest using the combined velocity model, wherein the combined image describes a plurality of different S-wave velocities and a plurality of different P-wave velocities in the geological region of interest.

20. The system of claim 18, wherein the trained model is a convolutional neural network comprising a plurality of convolutional layers, at least one downscaling layer, and a least one upscaling layer, wherein the trained model obtains a migrated seismic image as an input, and wherein the trained model generates a velocity boundary map as an output.

* * * * *